(12) United States Patent
Mertz et al.

(10) Patent No.: US 8,849,114 B2
(45) Date of Patent: Sep. 30, 2014

(54) NONLINEAR COMPENSATION IN WDM SYSTEMS

(71) Applicant: Infinera Corporation, Sunnyvale, CA (US)

(72) Inventors: Pierre Herve Mertz, Baltimore, MD (US); Hai Xu, North Laurel, MD (US); Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 43 days.

(21) Appl. No.: 13/724,436

(22) Filed: Dec. 21, 2012

(65) Prior Publication Data

US 2014/0093240 A1 Apr. 3, 2014

Related U.S. Application Data

(60) Provisional application No. 61/708,005, filed on Sep. 30, 2012.

(51) Int. Cl.
*H04B 10/00* (2013.01)
*H04J 14/00* (2006.01)
*H04J 14/02* (2006.01)

(52) U.S. Cl.
CPC ..................................... *H04J 14/02* (2013.01)
USPC ............................... 398/48; 398/65; 398/152

(58) Field of Classification Search
USPC ............... 398/45, 48, 55, 65, 82, 96, 88, 152, 398/201, 208, 212
See application file for complete search history.

(56) References Cited

U.S. PATENT DOCUMENTS 8,625,996 B2 * 1/2014 Tanaka et al. ................. 398/161
2013/0216228 A1 * 8/2013 Nazarathy et al. .............. 398/65

OTHER PUBLICATIONS

Liang Du et al., "Experimental Demonstration of XPM Compensation for CO-OFDM Systems with Periodic Dispersion Maps", *Optical Society of America, Optical Fiber Communication Conference of National Fiber Optic Engineers*, 2011, pp. 1-3.
Guanghao Zhu, "Experimental Demonstration of Postnonlinearity Compensation in a Multispan DPSK Transmission", *IEEE Photonics Technology Letters*, vol. 18. No. 9, May 1, 2006, pp. 1007-1009.

* cited by examiner

*Primary Examiner* — Dalzid Singh
(74) *Attorney, Agent, or Firm* — Harrity & Harrity LLP; David L. Soltz (57) ABSTRACT

A compensator device may include a selection switch to receive a first optical signal and provide first and second groups of channels associated with the first optical signal; a polarization beam splitter to receive the first channels, and provide first and second components; a photodiode that provides an electrical signal indicative of an intensity of the first group of channels; a first modulator to receive the electrical signal and the first components and to modulate the first components to form first modulated channels; a second modulator to receive the electrical signal and the second components to modulate the second components to form second modulated channels; a polarization beam combiner to receive the first and second modulated channels to form combined modulated channels; and a coupler to receive the combined modulated channels and the second group of channels to form a second optical signal.

20 Claims, 6 Drawing Sheets

NONLINEAR COMPENSATION IN WDM SYSTEMS

RELATED APPLICATION

This application claims priority under 35 U.S.C. §119 based on U.S. Provisional Patent Application No. 61/708,005, filed Sep. 30, 2012, the disclosure of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC. The receiver PIC may include a polarization beam splitter (PBS) to receive an optical signal (e.g., a WDM signal), split the optical signal, and provide two optical signals associated with the received optical signal. The receiver PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

A WDM signal may include channels susceptible to the Kerr effect. The Kerr effect is a change in the refractive index of a material in response to the intensity of the optical field. The Kerr effect may cause nonlinearities in a WDM signal which may lead to data loss and may prevent a receiver circuit from properly decoding the WDM signal. In an optical link where the dispersion stays near zero, such as in terrestrial dispersion managed links, or near the center of the repeater bandwidth in submarine links, the Kerr effect from neighboring channels, known as cross-phase modulation, is stronger than in terrestrial links that are not dispersion managed, or at the edges of the repeater bandwidth in submarine links.

SUMMARY

According to one example implementation, an optical system may include a compensator device having a wavelength selection switch (WSS) to receive a first optical signal and provide first channels, associated with the first optical signal, and second channels associated with the first optical signal; and a polarization beam splitter (PBS) to receive the first channels, and provide first components of the first channels and second components of the first channels. The first components may be associated with a first polarization and the second components may be associated with a second polarization. The optical system may also include a photodiode to measure an intensity of the first channels and provide an electrical signal indicative of the intensity of the first channels; and a first modulator to receive the electrical signal and the first components. The first modulator may modulate the first components, based on the electrical signal, to form first modulated channels.

The optical system may also include a second modulator to receive the electrical signal and the second components and to modulate the second components, based on the electrical signal, to form second modulated channels. The optical system may also include a polarization beam combiner (PBC) to receive the first modulated channels and the second modulated channels form combined modulated channels; and a coupler to receive the combined modulated channels and the second channels to form a second optical signal and to provide the second optical signal to a receiver module.

According to another example implementation, an optical system may include a compensator device having a wavelength selection switch (WSS) to receive a first optical signal and provide first channels, associated with the first optical signal, and second channels associated with the first optical signal; and a first PBS to receive the first channels, and provide first components of the first channels and second components of the first channels. The first components may be associated with a first polarization and the second components may be associated with a second polarization. The optical system may also include a photodiode to measure an intensity of the first channels and provide an electrical signal indicative of the intensity of the first channels; and a first modulator to receive the electrical signal and the first components. The first modulator may modulate the first components, based on the electrical signal, to form first modulated channels.

The optical system may also include a second modulator to receive the electrical signal and the second components and to modulate the second components, based on the electrical signal, to form second modulated channels. The optical system may also include a PBC to receive the first modulated channels and the second modulated channels form combined modulated channels; and a coupler to receive the combined modulated channels and the second channels to form a second optical signal and to provide the second optical signal to a receiver module.

The optical system may also include a receiver module having an optical demultiplexer circuit to receive the second optical signal and provide multiple signal channels corresponding to the second optical signal; multiple optical receivers to receive the multiple signal channels and to convert the multiple signal channels into corresponding electrical signals.

According to another example implementation, a compensator device may include a first circulator to receive a first optical signal; a WSS to receive the first optical signal from the first circulator and provide first channels, associated with the first optical signal, and second channels associated with the first optical signal; a mirror to receive the second channels and to reflect the second channels to the WSS; a second circulator to receive the first channels; and a PBS to receive the first channels from the second circulator, and provide first components of the first channels and second components of the first channels. The first components may be associated with a first polarization and the second components may be associated with a second polarization.

The optical system may also include a photodiode to measure an intensity of the first channels and provide an electrical signal indicative of the intensity of the first channels; and a first modulator to receive the electrical signal and the first components. The first modulator may modulate the first components, based on the electrical signal, to form first modulated channels. The optical system may also include a second modulator to receive the electrical signal and the second components and to modulate the second components, based on the electrical signal, to form second modulated channels. The optical system may also include a PBC to receive the first modulated channels and the second modulated channels form combined modulated channels. The PBC may provide the combined modulated channels to the second circulator. The second circulator may provide the second modulated channels to the WSS such that the WSS may combine the second channels and the combined modulated channels to form a second optical signal. The WSS may provide the second optical signal to the first circulator and the first circulator may provide the second optical signal to a receiver module.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Systems and/or methods, as described herein, may compensate for nonlinearities in a WDM signal having multiple polarizations (e.g., a first polarization, such as a transverse magnetic (TM), polarization and a second polarization, such as a transverse electric (TE) polarization). Further, the systems and/or methods may compensate for nonlinearities in a WDM signal transmitted via an optical fiber having zero dispersion. For example, the systems and/or methods may measure the intensity of channels (e.g., zero dispersion channels) that may cause a WDM signal to experience a Kerr effect. In some implementations, the systems and/or methods may modulate the phase of the zero dispersion channels to reverse a phase change associated with the intensity of the zero dispersion channels. For example, because the Kerr effect is proportional to optical intensity, modulating the phase of an optical signal in proportion to the measured intensity of a group of channels may reverse the Kerr effect on the WDM signal. As a result, the systems and/or methods may provide a WDM signal with fewer nonlinearities in relation to when the WDM signal is not modulated in accordance with the intensity of the zero dispersion channels. The systems and/or methods may be used in subsea implementations and/or in terrestrial implementations where modulation of zero dispersion channels may be needed (e.g., 10 G channels or where multiple groups of channel separation may be needed).

In some implementations, (e.g., in a submarine implementation where a WDM signal is transmitted near the center of the repeater bandwidth) an optical fiber used to transmit the WDM signal may be designed to have zero dispersion. In some implementations, (e.g., at the edges of the bandwidth), there may be either positive or negative net dispersion.

In some implementations, the systems and/or methods may reduce nonlinearities in a WDM signal provided by a transmitter module (e.g., a transmitter photonic integrated circuit (PIC)) and received by a receiver module (e.g., a receiver PIC). Additionally, or alternatively, the systems and/or methods may reduce nonlinearities from some other optical signal provided by some other type of module.

While a first polarization may be described herein as the TM polarization and a second polarization may be described herein as the TE polarization, in some other implementations, the first polarization may correspond to the TE polarization and the second polarization may correspond to the TM polarization.

Figure 1:
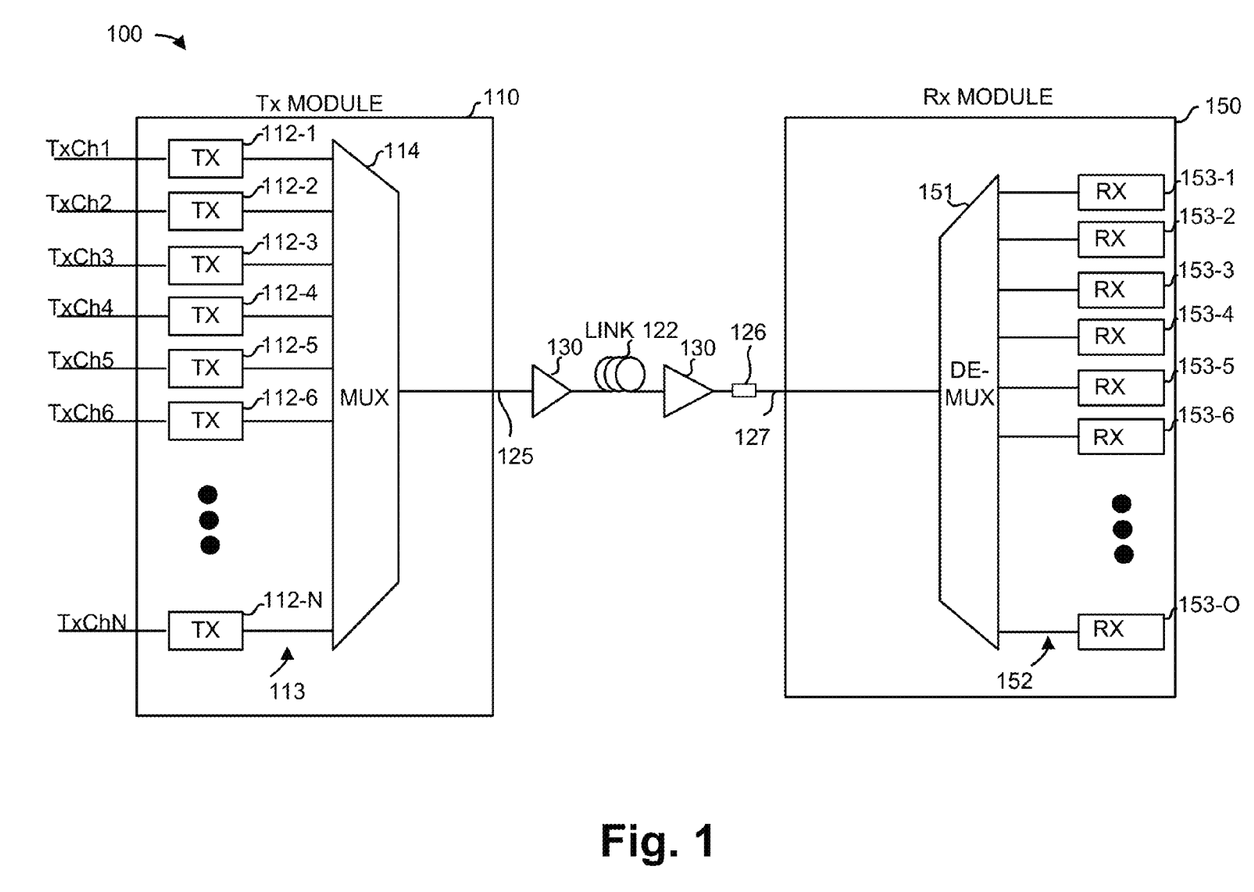
FIG. 1 is a diagram of an example network in which systems and/or methods may be implemented.

FIG. 1 is a diagram of an example network 100 in which systems and/or methods described herein may be implemented.

As illustrated in FIG. 1, network 100 may include transmitter (Tx) module 110 (e.g., a Tx PIC), nonlinear compensator 126, and/or receiver (Rx) module 150 (e.g., an Rx PIC). In some implementations, transmitter module 110 may be optically connected to receiver module 150 via link 122, and/or optical amplifiers 130. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, and/or optical multiplexer 114. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), and/or some other components. The laser, modulator, and/or SOA may be coupled with a tuning element (e.g., a heater) that can be used to tune the wavelength of the optical signal channel output by the laser, modulator, or SOA. In some implementations, a single laser may be shared by multiple optical transmitters 112.

Waveguides 113 may include an optical link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114. In some implementations, waveguides 113 may be made from a birefringent material and/or some other material.

Optical multiplexer 114 may include an arrayed waveguide grating (AWG) or some other multiplexing device. In some implementations, optical multiplexer 114 may combine multiple signal channels, associated with optical transmitters 112, into a wave division multiplexed (WDM) signal, such as optical signal 125.

Nonlinear compensator 126 may include an optical device or a collection of optical devices. In some implementations, nonlinear compensator 126 may receive an optical signal, such as optical signal 125 (e.g., via link 122), and may modulate channels of optical signal 125 corresponding to nonlinearities (e.g., zero dispersion channels). For example, nonlinear compensator 126 may measure the intensity of the zero dispersion channels and modulate the zero dispersion channels to provide optical signal 127 having fewer nonlinearities than optical signal 125. Nonlinear compensator 126 may compensate for nonlinearities in optical signals having a single polarization or having multiple polarizations. As shown in FIG. 1, nonlinear compensator 126 may provide optical signal 127 to receiver module 150. Some example operations of nonlinear compensator 126 will be described in greater detail below with respect to FIGS. 3A-3B. While nonlinear compensator 126 is shown as separate from receiver module 150, in some implementations, nonlinear compensator 126 may be provided as part of receiver module 150.

While nonlinear compensator 126 is shown as being part of environment 100 having transmitter module 110 and receiver module 150, in practice, nonlinear compensator 126 may be implemented in some other environment to remove nonlinearities in an optical system.

As further shown in FIG. 1, receiver module 150 may include optical demultiplexer 151, waveguides 152, and/or optical receivers 153-1 through 153-O (where O≥1). In some implementations, optical demultiplexer 151 may include an AWG or some other device. Optical demultiplexer 151 may supply multiple signal channels based on a received WDM signal (e.g., optical signal 127). As shown in FIG. 1, optical demultiplexer 151 may supply signal channels to optical receivers 153 via waveguides 152.

Waveguides 152 may include optical links to transmit outputs of optical demultiplexer 151 to optical receivers 153. In some implementations, each optical receiver 153 may receive outputs via a single waveguide 152 or via multiple waveguides 152. In some implementations, waveguides 152 may be birefringent (e.g., based on the width of waveguides 152).

Optical receivers 153 may each operate to convert the input optical signal to an electrical signal that represents the transmitted data. In some implementations, optical receivers 153 may each include one or more photodetectors and/or related devices to receive respective input optical signals outputted by optical demultiplexer 151 and a local oscillator, convert the signals to a photocurrent, and provide a voltage output to function as an electrical signal representation of the original input signal.

While FIG. 1 shows a particular configuration of components in network 100, in practice, network 100 may include additional components, different components, or differently arranged components than what are shown in FIG. 1. For example, as described above, nonlinear compensator 126 may be implemented in some other environment to reduce nonlinearities in an optical signal provided by a device other than transmitter module 110.

Figure 2A:
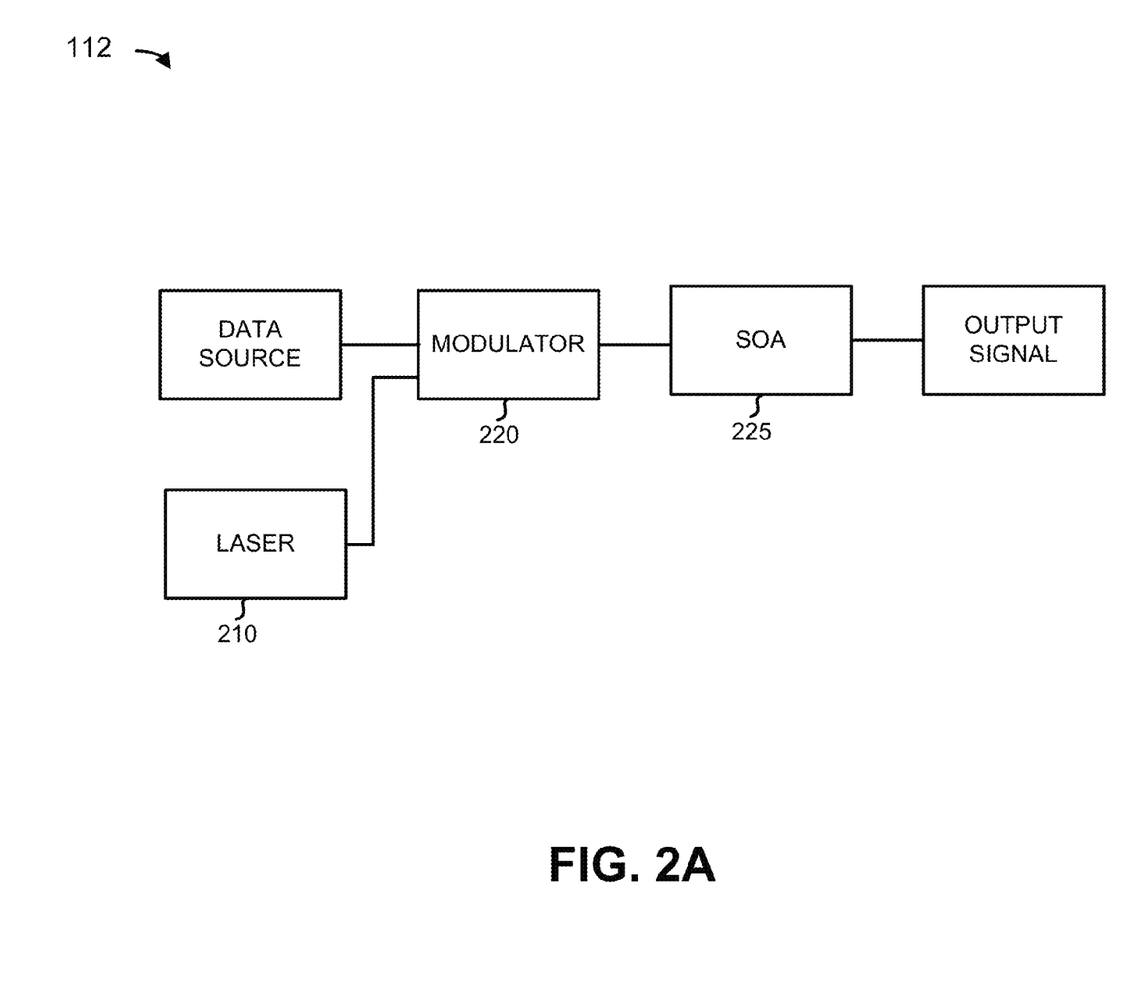
FIG. 2A is a diagram illustrating example components of an optical transmitter as shown in FIG. 1.

FIG. 2A is a diagram illustrating example elements of optical transmitter 112 as shown in network 100 of FIG. 1. As shown in FIG. 2A, optical transmitter 112 may include laser 210, modulator 220, and/or SOA 225.

Laser 210 may include a semiconductor laser, such as a distributed feedback (DFB) laser, or some other type of laser. Laser 210 may provide an output optical light to modulator 220. In some implementations, laser 210 may be an optical source for a single corresponding optical transmitter 112. In some implementations, laser 270 may be an optical source that is shared by multiple optical transmitters 112.

Modulator 220 may include an optical modulator, such as an electro-absorption modulator (EAM), a pair of nested Mach-Zender modulators (MZMs) for each polarization, or some other type of modulator. Modulator 220 may control (modulate) the intensity and phase of an input optical light (e.g., supplied by laser 210), based on an input voltage signal associated with a data source (e.g., signals provided over TxCh1 through TxChN). Modulator 220 may be formed as a waveguide with electrodes for applying an electric field, based on the input voltage signal, in a direction perpendicular to the light beam. Alternatively, modulator 220 may be implemented based on other modulation technologies, such as electro-optic modulation.

SOA 225 may include an amplifying device or a collection of amplifying devices. In some implementations, SOA 2250 may include an amplifier that may directly amplify an input optical signal (e.g., a signal supplied by laser 210). In some implementations, SOA 225 may be replaced by a variable optical attenuator (VOA), or by an element that combines both an SOA and a VOA.

While FIG. 2A shows optical transmitter 112 as including a particular quantity and arrangement of components, in some implementations, optical transmitter 112 may include additional components, fewer components, different components, or differently arranged components.

Figure 2B:
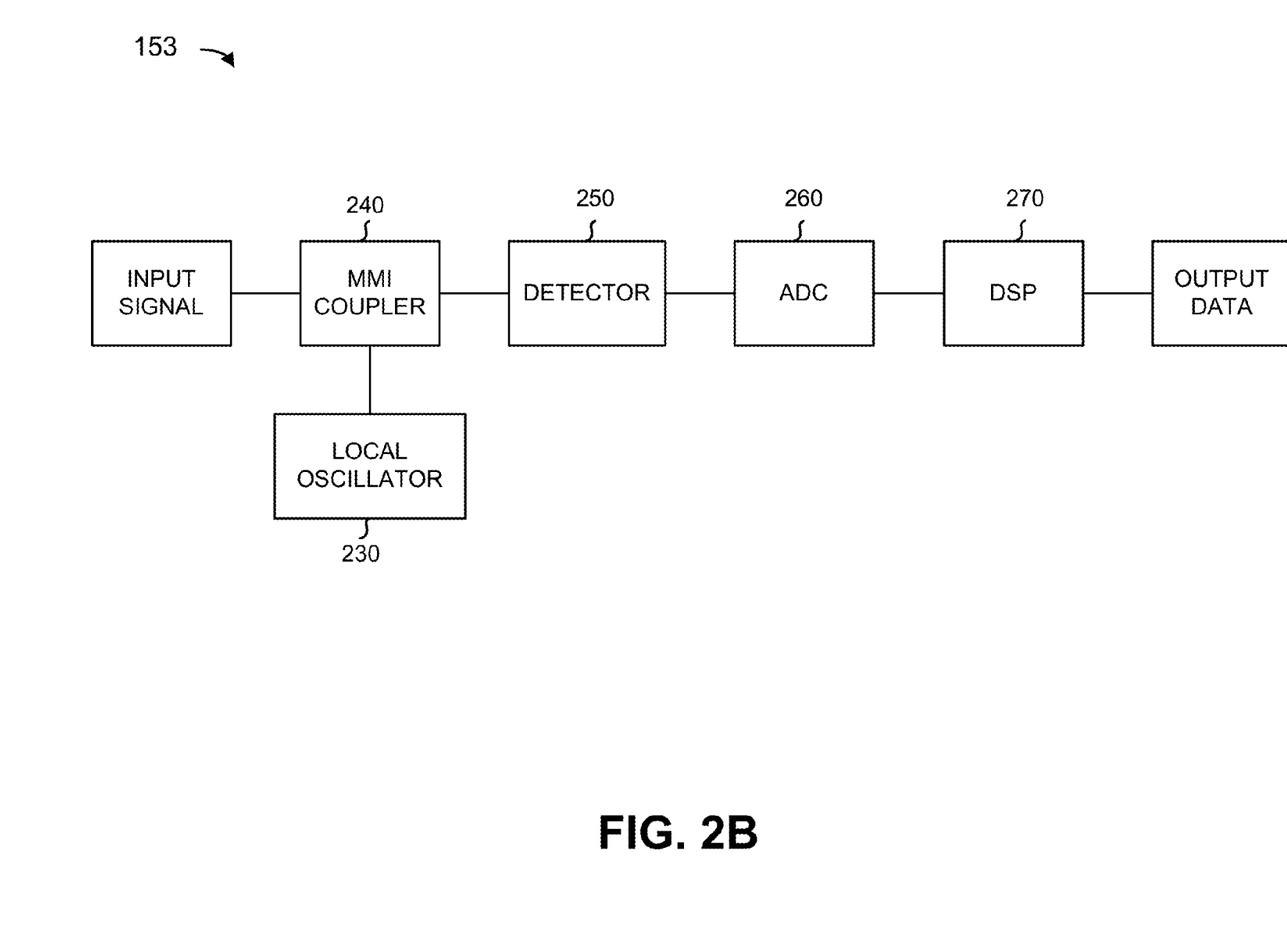
FIG. 2B is a diagram illustrating example components of an optical receiver as shown in FIG. 1.

FIG. 2B is a diagram illustrating example elements of optical receiver 153 as shown in network 100 of FIG. 1. As shown in FIG. 2B, optical receiver 153 may include local oscillator 230, multimoded interference (MMI) coupler 240, detector 250, analog-to-digital convert (ADC) 260, and/or digital signal processor (DSP) 270. In some implementations, local oscillator 230, MMI coupler 240, and detector 250 may be implemented on a single integrated circuit, such as a single PIC. In some implementations, ADC 260 and DSP 270 may be implemented using an application specific integrated circuit (ASIC) and/or may be implemented on a single integrated circuit, such as a single PIC. In some other implementations, local oscillator local oscillator 230, MMI coupler 240, detector 250, ADC 260, and/or RX DSP 270 may be implemented on one or more integrated circuits, such as one or more PICs.

Local oscillator 230 may include a laser, a collection of lasers, or some other device. In some implementations, local oscillator 230 may include a laser to provide an optical signal to MMI coupler 240. In some implementations, local oscillator 230 may include a single-sided laser to provide an optical signal to MMI coupler 240. In some other implementations, local oscillator 230 may include a double-sided laser to provide multiple optical signals to multiple MMI couplers 240.

MMI coupler 240 may include an optical device to receive an input single (e.g., a signal channel supplied by optical demultiplexer 151) and/or an optical signal from local oscillator 230. In some implementations, MMI coupler 240 may supply multiple signals associated with the received signal channel and optical signal to detector 250.

Detector 250 may include a photodetector, such as a photodiode, to receive the output optical signal, from MMI coupler 240, and convert the output optical signal to corresponding voltage signals. In some implementation, optical receiver 153 may include multiple detectors for in-phase x-polarization signals, quad-phase x-polarization signals, in-phase y polarization signals, and quad-phase y-polarizations.

ADC 260 may include an analog-to-digital converter that converts the voltage signals from detector 250 to digital samples. ADC 260 may provide the digital signals to DSP 270. DSP 270 may receive the digital signals from ADC 260 and may process the digital signals to form output data associated with the input signal received by MMI coupler 240. In some implementations, receiver module 153 may include four ADCs 260 or some other number of ADCs 260.

While FIG. 2B shows optical receiver 153 as including a particular quantity and arrangement of components, in some implementations, optical receiver 153 may include additional components, fewer components, different components, or differently arranged components.

Figure 3A:
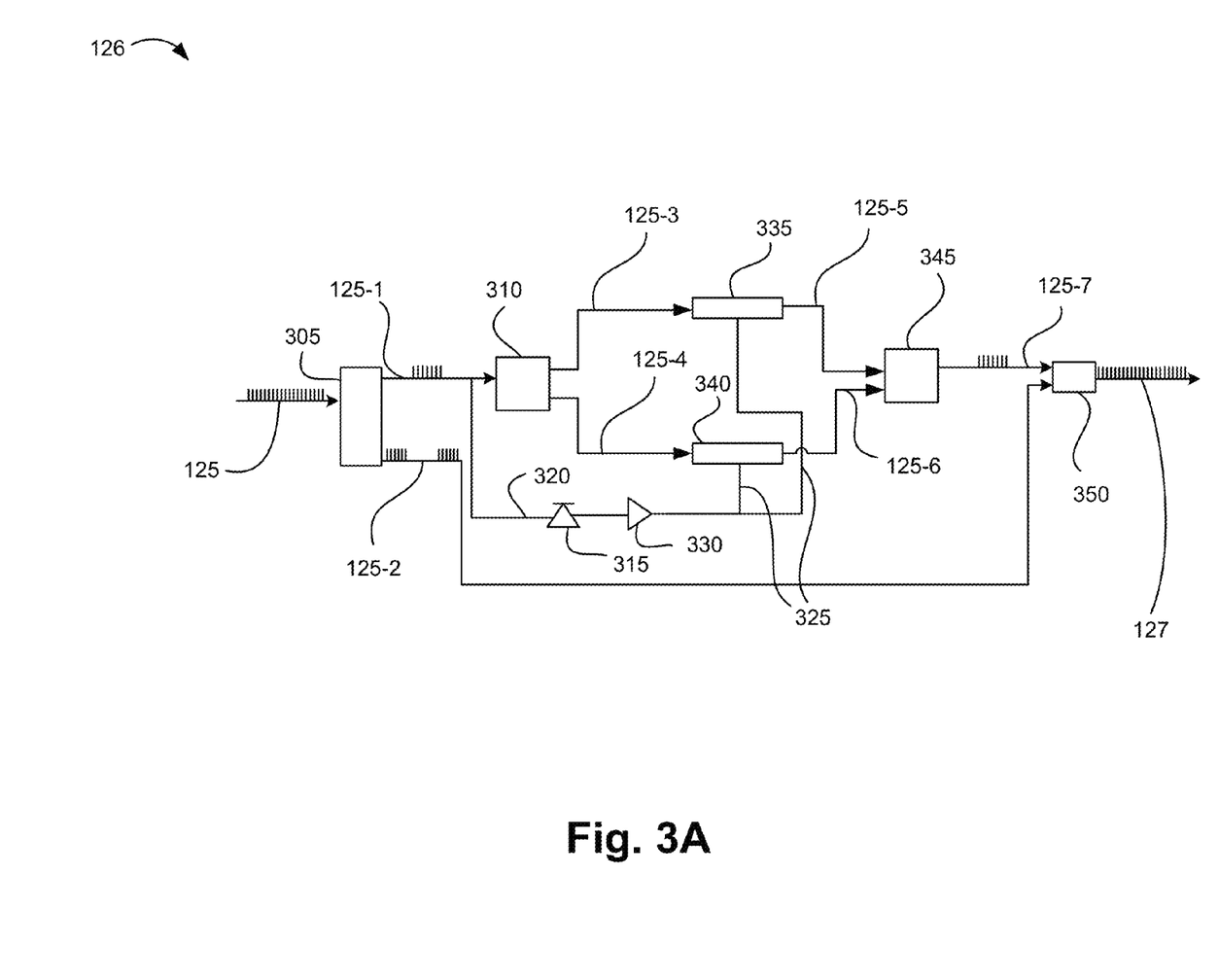
FIGS. 3A-3B illustrate example components of a nonlinear compensator device.
Figure 3B:
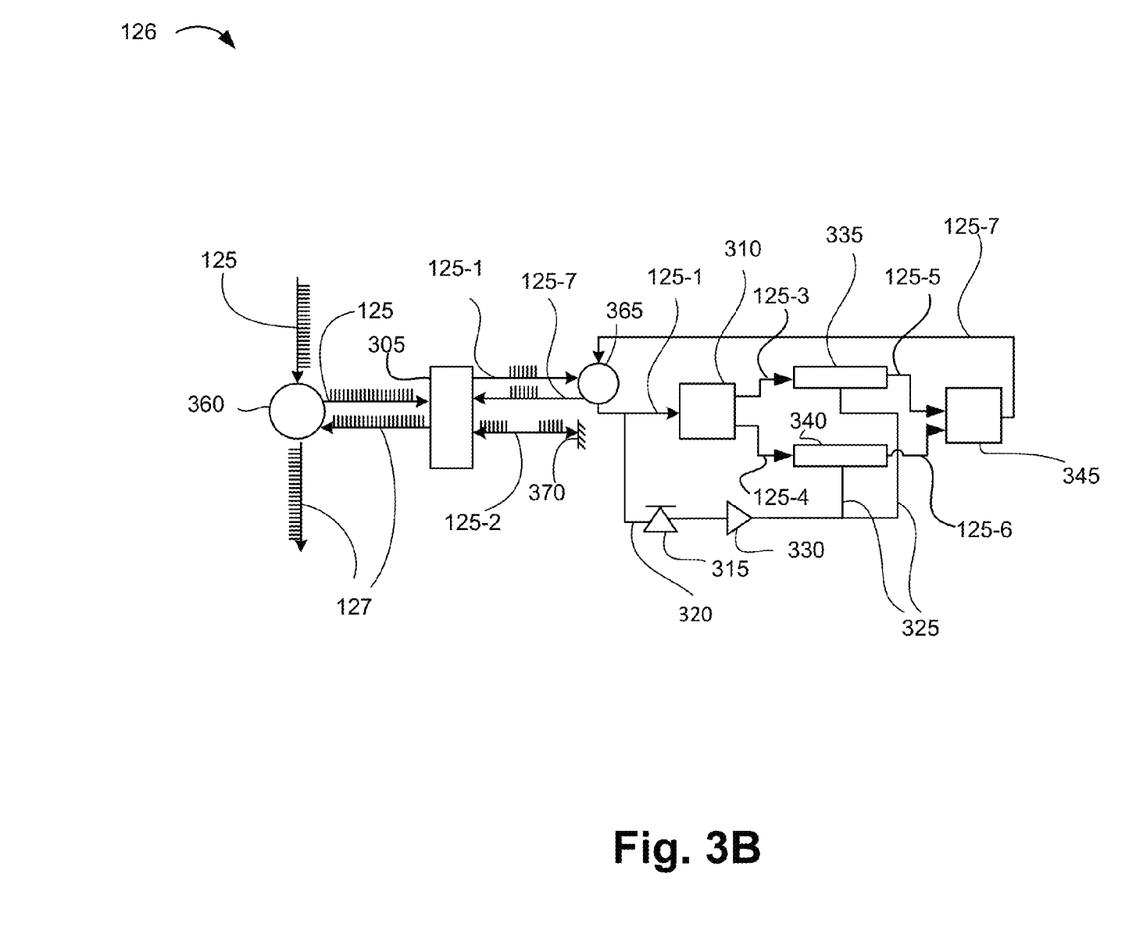

FIGS. 3A-3B illustrate example components of nonlinear compensator 126. As shown in FIG. 3A, nonlinear compensator 126 may include wavelength selective switch (WSS) 305, PBS 310, photodiode 315, amplifier 330, modulator 335, modulator 340, PBC 345, and coupler 350.

WSS 305 may include an optical device, such as an optical add-drop multiplexer (OADM) or some other type of optical device to route particular channels associated with an optical signal. In some implementations, WSS 305 may function as a coupler to combine optical signals into having multiple channels into a single optical signal. As shown in FIG. 3A, WSS 305 may receive optical signal 125 (e.g., from Tx module 110 via link 122) and may select a particular group of channels associated with optical signal 125 (e.g., center channels of a WDM signal related to zero-dispersion channels that may contribute to a Kerr effect). In some implementations, WSS 305 may provide, to PBS 310, first channels 125-1 (e.g., zero-dispersion channels of optical signal 125). WSS 305 may also provide second channels 125-2, having remaining channels of optical signal 125 not included in first channels 125-1, to coupler 350.

PBS 310 may include an optical device that receives an optical signal and provides first and second components of the received optical signal. As described above, the first components and the second components may have respective polarizations (e.g., a TM or TE polarization). As shown in FIG. 3A, PBS 310 may receive first channels 125-1 and output first components 125-3 and second components 125-4 associated with first channels 125-1. In some implementations, PBS 310 may provide first components 125-3 to modulator 335 and may provide second components 125-4 to modulator 340.

Photodiode 315 may include an optical device that receives an optical signal, and converts the received optical signal to a corresponding electrical signal. In some implementations, the electrical signal may be indicative of the intensity of the optical signal. Thus, photodiode 315 may measure an intensity of an optical signal by receiving the optical signal and converting the optical signal to a corresponding electrical signal. As shown in FIG. 3A, photodiode 315 may receive a portion of first channels 125-1 via link 320 and may convert the received optical signal to electrical signals 325. Photodiode 315 may provide electrical signals 325 to modulator 335 and modulator 340 (e.g., via amplifier 330).

Amplifier 330 may include an amplification device that receives an electrical signal and outputs an amplified electrical signal corresponding to the received electrical signal. As shown in FIG. 3A, amplifier 330 may receive electrical signals 325, amplify electrical signals 325, and provide electrical signals 325 to modulator 335 and modulator 340.

Modulator 335 may include an optical device that modulates a received optical signal based on a received electrical signal. As described above, modulator 335 may apply a phase change to an optical signal based on modulating the optical signal. In some implementations, modulator 335 may modulate an optical signal having a single polarization (e.g., a TM or TE polarization). As shown in FIG. 3A, modulator 335 may receive first components 125-3 and electrical signals 325. Thus, modulator 335 may modulate first components 125-3 (e.g., since first components 125-3 may have a single polarization, as described above with respect to PBS 310) based on electrical signals 325. In some implementations, modulator 335 may form first modulated channels 125-5. As described above, because phase is a function of intensity, modulating the intensity of an optical signal based on the intensity of the optical signal may change the phase of the optical signal in a manner that reverses the Kerr effect (e.g., by eliminating nonlinearities in the optical signal). Thus, first modulated channels 125-5 may include fewer nonlinearities than first components 125-3.

Modulator 340 may include an optical device similar to modulator 335. As shown in FIG. 3A, modulator 340 may receive second components 125-4 and may modulate second components 125-4 based on electrical signals 325. Thus, modulator 340 may modulate second components 125-4 (e.g., since second components 125-4 may have a single polarization, as described above with respect to PBS 310) based on electrical signals 325. In some implementations, modulator 340 may provide second modulated channels 125-6 having fewer nonlinearities than second components 125-4.

PBC 345 may include an optical device that combines optical signals, having respective polarizations, into a single optical signal. As shown in FIG. 3A, PBC 345 may receive first modulated channels 125-5 and second modulated channels 125-6 to form combined modulated channels 125-7, having channels and polarizations corresponding to first channels 125-1. In some implementations, combined modulated channels 125-7 may have fewer nonlinearities than first channels 125-1, since, as described above, first modulated channels 125-5 and second modulated channels 125-6 include fewer nonlinearities than components of first channels 125-1 (e.g., first components 125-3 and second components 125-4). In some implementations, PBC 345 may provide combined modulated channels 125-7 to coupler 350.

Coupler 350 may include an optical device (e.g., a 3-dB coupler or some other type of coupler) that combines optical signals into a single optical signal. As shown in FIG. 3A, coupler 350 may receive second channels 125-2 and combined modulated channels 125-7 to form optical signal 127. As a result, optical signal 127 may include un-modulated outer channels (e.g., second channels 125-2) combined with modulated center channels of first channels 125-1 (e.g., combined modulated channels 125-7). Thus, optical signal 127 may include a WDM signal having fewer nonlinearities than optical signal 125, thereby reducing the Kerr effect.

In some implementations, (e.g., as shown in FIG. 3B) nonlinear compensator 126 may also include circulator 360, circulator 365, and mirror 370 to receive and route optical signals in a manner different than what is shown in FIG. 3A.

As shown in FIG. 3B, nonlinear compensator 126 may include WSS 305, PBS 310, photodiode 315, amplifier 330, modulator 335, modulator 340, PBC 345, circulator 360, circulator 365, and mirror 370.

Circulator 360 may include a passive, non-reciprocal device having multiple ports, to receive a signal (e.g., via a first port), and transmit the received signal (e.g., via a second port). As shown in FIG. 3B, circulator 360 may receive optical signal 125 and provide optical signal 125 to WSS 305. Further, circulator 360 may provide optical signal 127 to receiver module 150.

As shown in FIG. 3B, WSS 305 may select first channels 125-1 and second channels 125-2. WSS 305 may provide first channels 125-1 to circulator 365 and may provide second channels 125-2 to mirror 370.

Circulator 365 may include a passive, non-reciprocal device having multiple ports, to receive a signal (e.g., via a first port), and transmit the received signal (e.g., via a second port). As shown in FIG. 3B, circulator 365 may receive first channels 125-1, and provide first channels 125-1 to PBS 310. Further, circulator 365 may provide combined modulated channels 125-7 to WSS 305.

Mirror 370 may include a reflecting material or a reflecting device. As shown in FIG. 3B, mirror 370 may receive second channels 125-2 from WSS 305 and may reflect second channels 125-2 back to WSS 305.

In some implementations, WSS 305 may provide first channels 125-1 to PBS 310 (e.g., via circulator 365). As described above, PBS 310 may split first channels 125-1 to provide first components 125-3 and second components 125-4 to modulator 335 and modulator 340, respectively. Photodiode 315 may receive a portion of first channels 125-1 via link 320, convert the received portion of first channels 125-1 to electrical signals 325, and provide electrical signals 325 to modulator 335 and modulator 340 (e.g., via amplifier 330). As described above, electrical signals 325 may be indicative of an intensity of first channels 125-1.

As described above, modulator 335 may provide first modulated channels 125-5 to PBC 345, and modulator 340 may provide second modulated channels 125-6 to PBC 345. In some implementations, PBC 345 may combine first modulated channels 125-5 and second modulated channels 125-6 to form optical signal 125-7. As further shown in FIG. 3B, PBC 345 may provide combined modulated channels 125-7 to circulator 365 such that circulator 365 may provide combined modulated channels 125-7 to WSS 305. In some implementations, WSS 305 may function as a coupler to combine second channels 125-2 and combined modulated channels 125-7 to form optical signal 127. As shown in FIG. 3B, WSS 305 may provide optical signal 127 to circulator 360 for transmission of optical signal 127 (e.g., to receiver module 150).

In some implementations, nonlinear compensator 126 may include additional, fewer, or differently arranged components than what are shown in FIGS. 3A-3B. Further, nonlinear compensator 126 may include some other components to receive and route optical signals in some other manner not described above.

Figure 4:
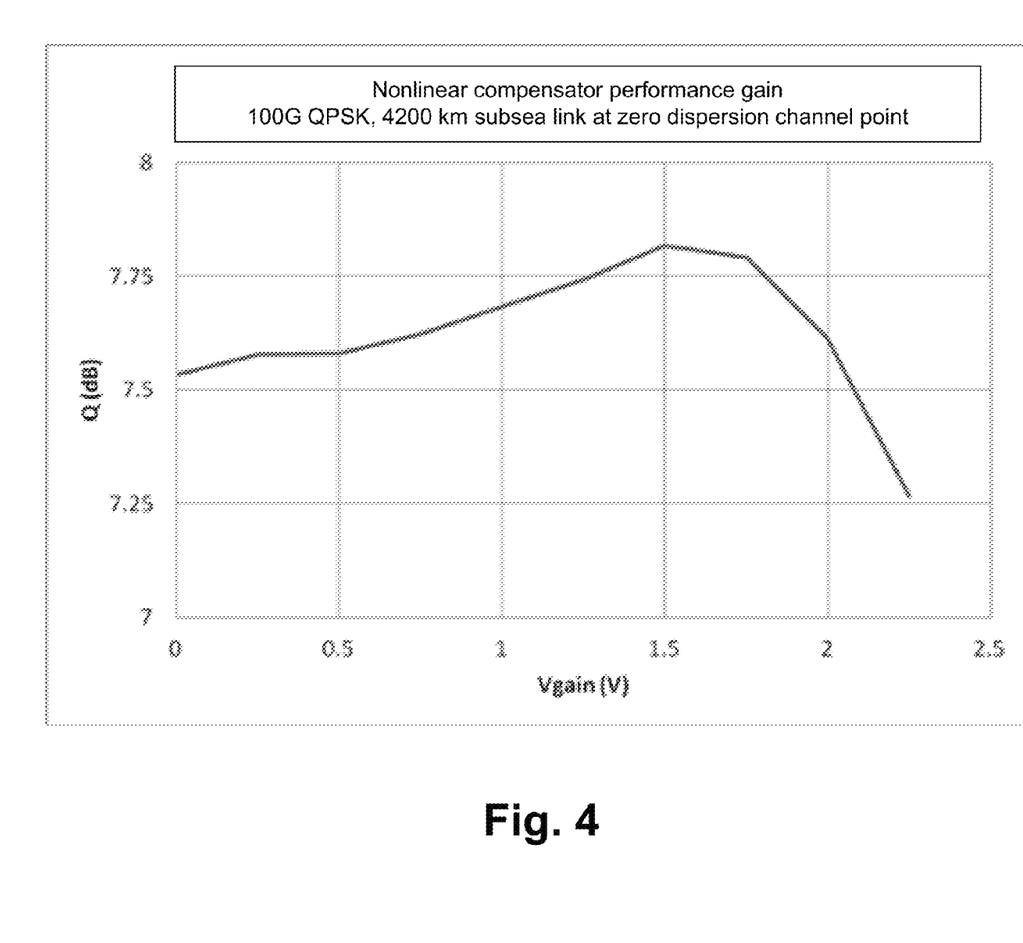
FIG. 4 is a graph illustrating example transmission characteristics of an optical signal processed by a nonlinear compensator device of FIG. 3A or FIG. 3B.

FIG. 4 is a graph illustrating example transmission characteristics of an optical signal processed by nonlinear compensator device 126. FIG. 4 illustrates a voltage gain (vgain) in the transmission of an optical signal (e.g., an optical signal processed by nonlinear compensator device 126) being transmitted via a 100 G, quad phase-shift keying (QPSK), 4200 km optical link at a particular decibel (dB) level and at a frequency corresponding to zero dispersion channels of the optical signal. As shown in FIG. 4, where the WDM signals goes through a subsea link, the received quality of a zero dispersion channel is improved from approximately 7.5 dB to approximately 7.8 dB when the optical signal is processed by nonlinear compensator 126.

While particular voltage gain values are shown in FIG. 4, in practice, the voltage gain may vary for different ranges of dBs, transmission frequencies, or types of optical links.

As described above, nonlinear compensator 126 may select channels (e.g., zero-dispersion channels) that may cause a WDM signal to experience a Kerr effect, measure an intensity of the zero-dispersion channels, modulate the zero-dispersion channels based on an electrical signal indicative of the intensity of the zero-dispersion channels, and combine the modulated zero-dispersion channels with non-selected channels to form a WDM signal having modulated channels. Thus, nonlinear compensator 126 may provide a WDM signal having fewer nonlinearities than a WDM signal with un-modulated zero-dispersion channels. Further, nonlinear compensator 126 may compensate for nonlinearities in a WDM signal having multiple polarizations, as described above. As described above, nonlinear compensator 126 may be implemented in some other environment to reduce nonlinearities in an optical signal provided by a device other than transmitter module 110.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. An optical system comprising:
 a compensator device having:
  a wavelength selection switch (WSS) to receive a first optical signal and provide first channels, associated with the first optical signal, and second channels associated with the first optical signal;
  a polarization beam splitter (PBS) to receive the first channels, and provide first components of the first channels and second components of the first channels, the first components being associated with a first polarization and the second components being associated with a second polarization;
  a photodiode that provides an electrical signal indicative of an intensity of the first channels;
  a first modulator to receive the electrical signal and the first components,
   the first modulator modulating the first components, based on the electrical signal, to provide first modulated channels;
  a second modulator to receive the electrical signal and the second components,
   the second modulator modulating the second components, based on the electrical signal, to provide second modulated channels;

a polarization beam combiner (PBC) to receive the first modulated channels and the second modulated channels to provide combined modulated channels; and a coupler to receive the combined modulated channels and the second channels to provide a second optical signal to a receiver module.

2. The optical system in accordance with claim 1, where the combined modulated channels include fewer nonlinearities than the first channels.

3. The optical system in accordance with claim 1, further including an amplifier to receive the electrical signal and to amplify the electrical signal, the first modulator and the second modulator receiving the amplified electrical signal.

4. The optical system in accordance with claim 1, further including a circulator to provide the second optical signal to the receiver module.

5. The optical system in accordance with claim 1, where the WSS is an optical add-drop multiplexer (OADM).

6. The optical system in accordance with claim 1, where the first polarization is a transverse electric (TE) polarization and the second polarization is a transverse magnetic (TM) polarization.

7. The optical system in accordance with claim 1, where the first polarization is a transverse magnetic (TM) polarization and the second polarization is a transverse electric (TE) polarization.

8. The optical system in accordance with claim 1, further including:

the receiver module having:
an optical demultiplexer circuit to receive the second optical signal and provide a plurality of signal channels corresponding to the second optical signal; and
a plurality of optical receivers to receive the plurality of signal channels and to convert the plurality of signal channels into corresponding electrical signals.

9. An optical system comprising:
a compensator device having:
a wavelength selection switch (WSS) to receive a first optical signal and provide first channels, associated with the first optical signal, and second channels associated with the first optical signal,
a polarization beam splitter (PBS) to receive the first channels, and provide first components of the first channels and second components of the first channels,
the first components being associated with a first polarization and the second components being associated with a second polarization;
a photodiode that provides an electrical signal indicative of an intensity of the first channels,
a first modulator to receive the electrical signal and the first components,
the first modulator modulating the first components, based on the electrical signal, to provide first modulated channels,
a second modulator to receive the electrical signal and the second components,
the second modulator modulating the second components, based on the electrical signal, to provide second modulated channels,
a polarization beam combiner (PBC) to receive the first modulated channels and the second modulated channels provide combined modulated channels, and
a coupler to receive the combined modulated channels and the second channels to provide a second optical signal; and a receiver module having:
an optical demultiplexer circuit to receive the second optical signal and provide a plurality of signal channels corresponding to the second optical signal, and
a plurality of optical receivers to receive the plurality of signal channels and to convert the plurality of signal channels into corresponding electrical signals.

10. The optical system in accordance with claim 9, where the combined modulated channels include fewer nonlinearities than the first channels.

11. The optical system in accordance with claim 9, further including an amplifier to receive the electrical signal and to amplify the electrical signal, the first modulator and the second modulator receiving the amplified electrical signal.

12. The optical system in accordance with claim 9, further including a circulator to provide the second optical signal to the receiver module.

13. The optical system in accordance with claim 9, where the WSS is an optical add-drop multiplexer (OADM).

14. The optical system in accordance with claim 9, where the first polarization is a transverse electric (TE) polarization and the second polarization is a transverse magnetic (TM) polarization.

15. The optical system in accordance with claim 9, where the first polarization is a transverse magnetic (TM) polarization and the second polarization is a transverse electric (TE) polarization.

16. A compensator device having:
a first circulator to receive a first optical signal;
a wavelength selection switch (WSS) to receive the first optical signal from the first circulator and provide first channels, associated with the first optical signal, and second channels associated with the first optical signal;
a mirror to receive the second channels and to reflect the second channels to the WSS;
a second circulator to receive the first channels;
a polarization beam splitter (PBS) to receive the first channels from the second circulator, and provide first components of the first channels and second components of the first channels,
the first components being associated with a first polarization and the second components being associated with a second polarization;
a photodiode that provides an electrical signal indicative of an intensity of the first channels;
a first modulator to receive the electrical signal and the first components,
the first modulator modulating the first components, based on the electrical signal, to provide first modulated channels;
a second modulator to receive the electrical signal and the second components,
the second modulator modulating the second components, based on the electrical signal, to provide second channels; and
a polarization beam combiner (PBC) to receive the first modulated channels and the second modulated channels and to provide combined modulated channels from the first modulated channels and the second modulated channels,
the PBC providing the combined modulated channels to the second circulator,
the second circulator providing the combined modulated channels to the WSS, the WSS combining the second channels and the combined modulated channels to form a second optical signal, the WSS providing the second optical signal to the first circulator, and the first circulator providing the second optical signal to a receiver module.

17. The compensator device in accordance with claim 16, where the combined modulated channels include fewer non-linearities than the first channels.

18. The compensator device in accordance with claim 16, where the WSS is an optical add-drop multiplexer (OADM).

19. The compensator device in accordance with claim 16, where the first polarization is a transverse electric (TE) polarization and the second polarization is a transverse magnetic (TM) polarization.

20. The compensator device in accordance with claim 16, where the first polarization is a transverse magnetic (TM) polarization and the second polarization is a transverse electric (TE) polarization.

\* \* \* \* \*